G. F. ROSE.
TYPE WRITER.
APPLICATION FILED JULY 11, 1911.
1,138,318.
Patented May 4, 1915.
2 SHEETS—SHEET 2.
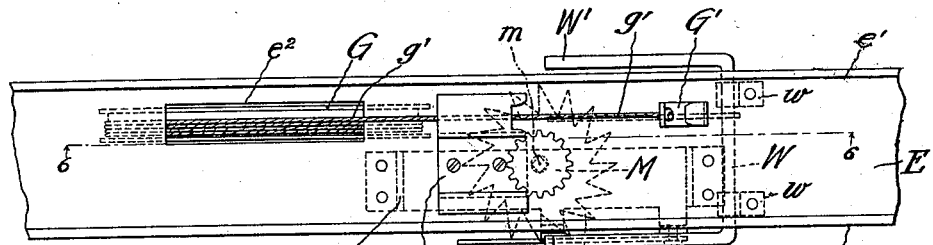
Fig. 5.
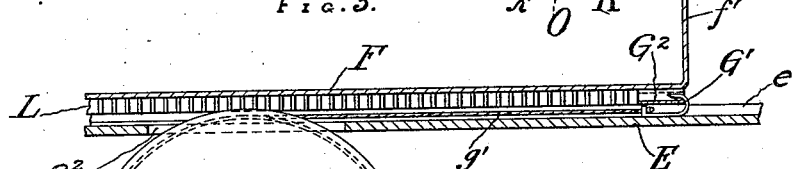
Fig. 6.
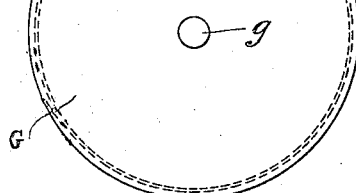
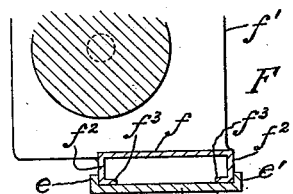
Fig. 7.
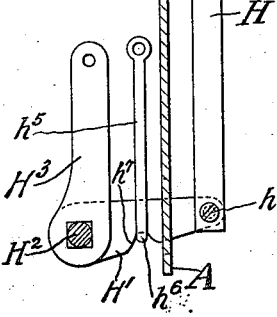
Fig. 8.
WITNESSES:
H. E. A. Raabe
J. T. Mothershead
INVENTOR
George F. Rose,
By Griffin Branford
ATTORNEYS.

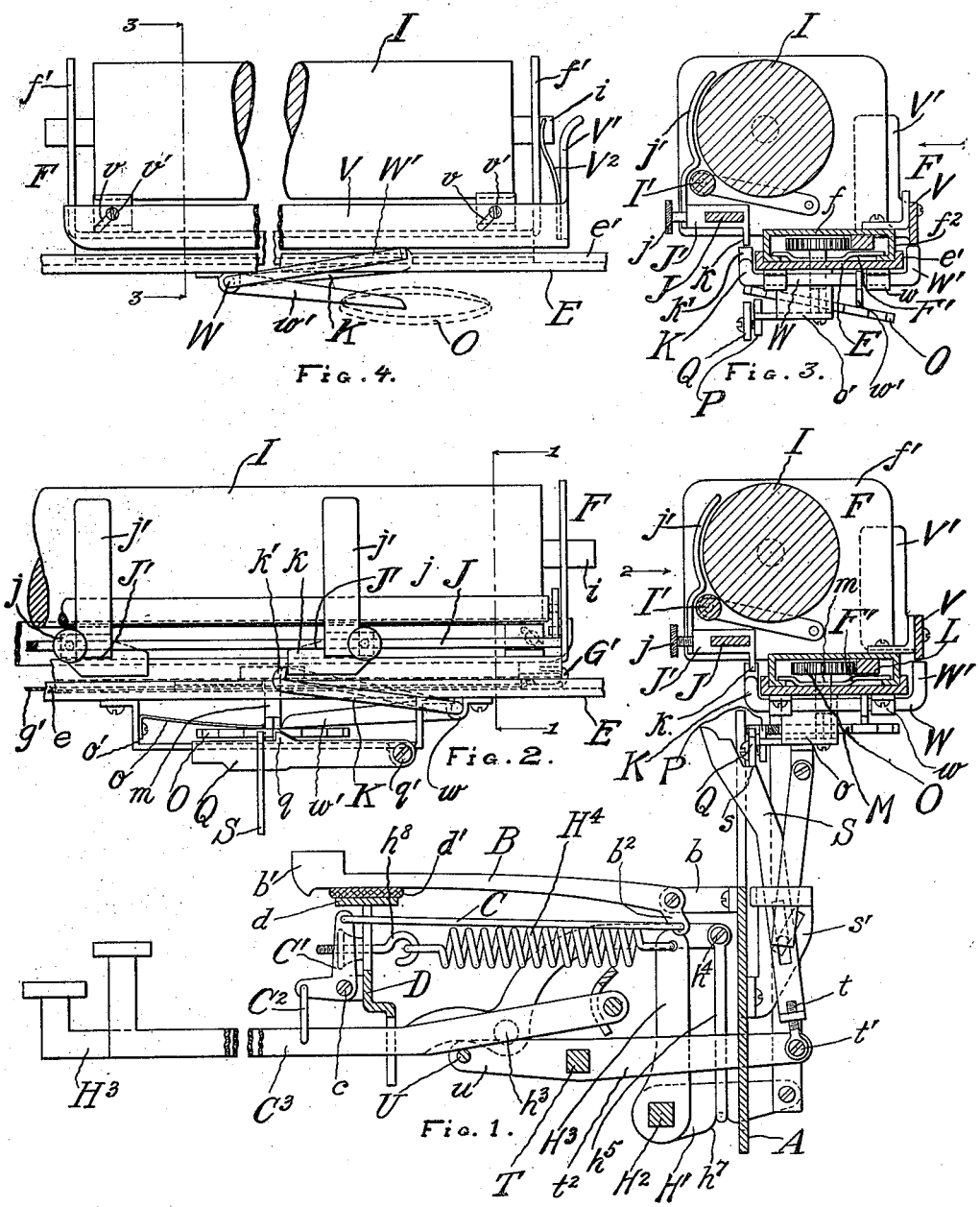

UNITED STATES PATENT OFFICE.

GEORGE F. ROSE, OF NEW YORK, N. Y.

TYPE-WRITER.

1,138,318.  Specification of Letters Patent.  Patented May 4, 1915.

Application filed July 11, 1911. Serial No. 637,900.

*To all whom it may concern:*

Be it known that I, GEORGE F. ROSE, a citizen of the United States, residing in the city of New York, borough of Manhattan, county and State of New York, have invented a certain new and useful Type-Writer, of which the following is a specification.

This invention is a typewriter embodying several features of novelty among which may be mentioned a removable carriage, means whereby the carriage may be automatically disconnected from the escapement, means whereby the carriage upon its insertion into the machine may be automatically connected with the carriage-spring, means whereby the carriage upon its removal from the machine may be automatically disconnected from the carriage-spring, and means whereby the carriage-spring is automatically retained under tension when the carriage is disconnected from said spring.

Another important feature of the machine is the fact that the removability of the carriage readily permits of interchanging carriages, carrying different sized platens, whereby the machine is adapted to operate on all widths of paper.

In recent years numerous attempts have been made to render typewriters compact and portable, an example of which is shown in a prior patent to Frank S. Rose, No. 754,242, granted March 8, 1904, and in response to a demand, the subject of portable machines is receiving large attention by manufacturers. The present invention embodies all the advantages of portability and compactness in said prior machine, and in addition, several improvements thereon, the advantages of which will hereinafter appear.

It is to be understood, therefore, that the aim of the present invention is to supply the demand for a portable machine.

In the accompanying drawings, 1 have illustrated one practical embodiment of the invention, but the construction shown therein is to be understood as illustrative, only, and not as defining the limits of the invention.

Figure 1 is a vertical cross section through a typewriter illustrating the salient features of the present invention, the plane of the cross section being indicated by the dotted line 1—1 of Fig. 2. Fig. 2 is a rear elevation of the bed and platen carriage of the machine, illustrating the operation of the escapement mechanism, the parts being shown in their normal positions wherein the escapement is adapted to control the step-by-step movement of the carriage. Fig. 3 is a vertical cross section on the line 3—3 of Fig. 4 illustrating the parts in position for the removal of the carriage from the bed. Fig. 4 is a rear elevation of a part of the carriage and the bed with the several parts of the escapement and other devices in a position to permit the withdrawal of the carriage from the bed by merely sliding said carriage along said bed. Fig. 5 is a plan view with the carriage removed, illustrating the bed upon which the carriage is adapted to slide, the main spring for imparting movement to the carriage in one direction and the escapement mechanism adapted to control the movement of the carriage. Fig. 6 is a longitudinal section on the line 6—6 of Fig. 5. Fig. 7 is a detail view in side elevation of detent mechanism adapted to act upon the escapement for releasing said escapement from its operative engagement with the carriage, said detent mechanism operating in its normal position to lock the carriage against movement in one direction when it reaches the end of a writing line. Fig. 8 is a vertical section with parts omitted illustrating the position of the platen carriage when raised and some of the devices for lifting the platen carriage in order that the upper case letters of the type bars may strike the paper on the platen carriage in the writing line.

The drawings illustrate a part of the main frame for supporting the operating mechanism, said main frame including a vertical plate A to which is attached a series of brackets $b$ for supporting type bars B. Said type bars are provided with type heads $b'$ having the usual type characters. Each type bar is shown as being provided with a depending lug $b^2$ to which is connected a link C, the forward end of which link is connected to an upstanding arm of a bell crank lever C', said lever being fulcrumed at $c$ and having a depending link $C^2$ connected to a horizontal arm, said depending link being attached to a key lever $C^3$, all as clearly shown in Fig. 1. The bell crank levers of the series employed for the operation of the type bars are supported on a plate D forming a part of the machine frame. Said plate D is provided at its upper edge with a transverse flange $d$, the latter supporting a bed or cushion $d'$ upon which the type bars are adapted to rest when in their normal position.

E designates a bed for supporting a platen carriage F. Bed E consists of a single flat horizontal plate, preferably composed of pressed steel, although other materials may be employed. The plate composing the bed for the platen carriage is provided at its front edge with a flange $e$, and at its rear edge with a similar flange $e'$, said flanges being bent or turned up from the plate and being positioned parallel to each other. The flanges extend the full length of the plate, and are continuous or unbroken throughout the length of the plate, said flanges operating as a way or guide for the carriage. The plate is provided intermediate its ends with longitudinal slot $e^2$, see Fig. 5, and in this slot works the upper edge of main spring drum or barrel G, the latter being mounted on a shaft $g$ suitably journaled in the machine frame, but preferably mounted beneath the bed E, so as to partake of the vertical movement of the latter when the carriage is raised and lowered, as required in the operation of the machine. The main spring drum will be described more particularly hereinafter.

Bed E is supported or carried by a plurality of vertical stems H, one of which is shown in Figs. 1 and 8. Each vertical stem is provided at its upper end with a horizontal arm $h$, fitted against, and secured firmly to, the under side of bed E. Stem H is supported and guided in a bracket $h'$ secured to the rear of frame plate A, and to the lower end of each vertical stem is pivoted, at $h^2$, a rocker arm H', the rocker arms of the stems H being rigidly attached to a horizontal rock shaft $H^2$. Said rock shaft is positioned in front of frame plate A, and it is journaled in suitable bearings (not shown) of the machine frame. Two of the rocker arms H' are employed, each rocker arm being associated with one stem H and with a shift key lever, one of said shift key levers being indicated at $H^3$ in Fig. 1. The shift key lever is fulcrumed intermediate its ends as at $h^3$, and to the inner end of this lever is pivoted, at $h^4$, a vertical link $h^5$. Said link is provided with a hook-shaped lower end $h^6$ adapted to fit into a notch $h^7$ provided in the under side of a rocker arm H'. To the rock shaft $H^2$ there is attached an upstanding arm $H^3$, and to the upper part of this arm is connected a coiled spring $H^4$, the front end of which spring is connected to an anchor bolt $h^8$, the latter being adjustable to the frame plate D, whereby said anchor bolt may be adjusted, for the purpose of regulating the tension exerted by spring $H^4$ on rock shaft $H^2$, for the purpose of promptly returning the carriage bed E to its normal position.

The carriage F embodies in its construction a base $f$ and end pieces $f'$, said end pieces being preferably integral with the base $f$. The base is provided with depending flanges $f^2$ which are inturned to produce guide ribs $f^3$, shown more particularly in Figs. 1, 3 and 8. The inturned ribs $f^3$ rest upon the top face of bed E, and the depending flanges $f^2$ are fitted accurately between flanges $e$, $e'$, whereby the carriage is fitted upon the bed so as to slide freely thereon in the direction of the length of the bed, the flanges on the bed coöperating with the flanges on the carriage base, so as to preclude any transverse or lateral movement of the carriage relative to said bed. The carriage is retained against accidental displacement in an upward direction relative to the bed by the employment of a keeper F', said keeper being in the form of a plate attached rigidly to the bed E intermediate the ends of the latter, and preferably adjacent slot $e^2$ in the bed, substantially as shown in Fig. 5. The end portions of keeper F' are bent upwardly so as to have overlapping engagement with the inturned ribs $f^3$ of the carriage base, whereby the keeper acts to retain the carriage base in proper position upon bed E, but the carriage is free to have endwise movement relative to the bed and the keeper.

Carriage F is equipped with a platen I, the shaft $i$ of which is suitably mounted in end pieces $f'$ of said carriage. Coöperating with the platen is a pressure roll I', and beneath the platen is a horizontal bar J, the latter being attached rigidly to the end pieces $f'$ of the carriage. This bar J supports the adjustable stops J' each adapted to be retained in position by a binding screw $j$. Each stop J' carries a paper clip $j'$, the latter coöperating with the platen, for the purpose of retaining the paper in operative position upon said platen. In addition to the described features, the carriage is equipped with other devices of any suitable or preferred construction, for the purpose of facilitating the control of the paper, but as these devices form no part of the present invention, it has not been considered necessary to further describe or illustrate them. Each stop J' is provided with a depending member $k$ which is so arranged that it will coöperate with a detent member K, said detent member being in the form of an arm pivotally supported on the bed E, said arm being provided at its free end with a nose $k'$ which is normally in the path of the depending member $k$ of each stop J'. As the carriage moves in one direction the depending member $k$ of one stop is adapted for engagement with the nose $k'$ of the detent member so as to limit the movement of the carriage in one direction. When the carriage moves in an opposite direction the depending member $k$ of the other stop $J'$ will engage with the nose $k'$ of the detent member, for the purpose of limiting the movement of the carriage in said other direction. The stops $J'$ being adjustable on the bar J, it is evident that the movement of the carriage may be varied as desired, for the purpose of decreasing or increasing the length of the writing line.

Spring drum G contains a main spring of any usual or preferred form, and this drum is provided with a peripheral groove within which is coiled a band, tape, strap, cord or other flexible connection indicated at $g'$. The flexible connection is adapted to pass freely through slot $e^2$ of bed E, and this flexible connection is attached to a coupling G', shown more particularly in Figs. 5 and 6, and indicated in dotted lines in Fig. 2. This coupling is in the form of a hook-shaped plate provided at one end with a flange to which is attached one end of the flexible connection $g'$. At the under side of the carriage base $f$, at one end thereof, is rigidly secured a plate $G^2$ which is positioned for engagement with the coupling member G', whereby the carriage during the operation of inserting the same into the machine will be automatically connected with the flexible connection $g'$ of the main spring. It will be understood that in my machine the carriage is adapted to be withdrawn from bed E by moving said carriage lengthwise of the bed, and when the carriage has been moved a certain distance coupling member G' will be brought into engagement, by the action of the spring on the flexible connection $g'$, with one bent end of keeper F', whereby the coupling G' is automatically disengaged from plate $G^2$ of the carriage and is engaged with keeper F', thus permitting the carriage to be withdrawn from bed E while at the same time the main spring is precluded from unwinding by the engagement of coupling G' with keeper F'. The coupling is thus positioned and retained on the bed to keep the main spring under tension, and said coupling is in the path of the carriage for engagement automatically with plate $G^2$ when said carriage is again inserted into the machine. When the carriage is again inserted, its flanges $f^2$, $f^3$ are positioned to rest upon bed E between flanges $e$, $e'$ thereof, and by sliding the carriage along said bed E, the plate $G^2$ of the carriage is engaged with coupling G', so as to connect the cord or strap $g'$ with said carriage, thus automatically connecting the carriage and the main spring by the operation of replacing the carriage within the machine. The carriage is thus placed under the tension of the main spring, and no separate or hand operation is necessary to connect said spring to the carriage. When the carriage is inserted as described, the ribs $f^3$ thereof slide below the upturned end portions of keeper F', the latter acting to keep the carriage in close relation to the bed E and, also, to preclude displacement of the carriage in an upward direction from said bed. The carriage passes also, over detent K, by the beveled end of stop mechanism $k$ of margin stop J riding upon and depressing the detent, see Fig. 3.

Rigidly secured to the under face of base $f$ of carriage F is a rack L. Said rack is positioned between depending flanges $f^2$ on the base of the carriage, the rack being provided on one of its edges with a series of teeth, as shown in Fig. 6, said teeth meshing with a gear M, see Figs. 1, 3 and 5. The gear is positioned above bed E and between the flanges $f^2$ of the carriage, said gear being attached to the upper end portion of a vertically positioned shaft $m$. Said shaft is mounted or journaled in bed E, so as to extend through the bed and depend below it for a suitable distance. The gear and its shaft form a part of an escapement mechanism, which escapement is novel in construction. I do not, however, claim the particular form of escapement about to be described, for the reason that it will be made the subject matter of a separate application.

One element of the escapement mechanism is a rotating and oscillating escapement wheel O illustrated in Figs. 1 and 2, and in dotted lines in Fig. 5. Said escapement wheel is mounted loosely on the lower part of shaft $m$, said lower part of the shaft being square or polygonal in form and the escapement wheel having a square hole adapted to receive the square part of the shaft, for the purpose of making the wheel turn with the shaft at all times, and yet allowing the wheel to have a tilting or sidewise movement relative to the shaft. Coöperating with this escapement wheel is a fixed dog P and a movable dog Q, said fixed dog being supported in a stationary position by suitable devices depending from the under side of bed E, whereby the fixed dog is normally in the path of the escapement wheel O. The escapement wheel is normally depressed by a spring $o$ attached to one end of a bracket $o'$ secured rigidly to the under side of the bed E, said bracket $o'$ operating to support the working parts of the escapement below bed E. The escapement wheel is retained by the bracket and the spring normally in a horizontal position, as shown in Fig. 2, so that one tooth of the escapement wheel will be engaged by the fixed dog P, thus locking the escapement wheel from rotation and precluding shaft $m$ and gear M from movement under the pull of the main spring on the carriage. The movable dog Q of the escapement is engaged normally with a shoulder s on the upper end of escapement slide S, the latter being disposed in a vertical position substantially at the rear of vertical plate A. This slide S is mounted in a bracket s' fixed to the rear of plate A, so that the slide S is capable of a vertical sliding motion. To the lower end of slide S is connected a screw t having pivotal connection at t' with a rearwardly extending arm $t^2$ rigidly affixed to a universal bar T, said bar T being provided with forwardly extending arms u which carry a universal rod U, the latter being positioned below the key levers $C^3$, whereby the depression of either key lever will act on the universal rod U, for the purpose of rocking the universal bar T. When the arms u of the universal bar are depressed by the action of either one of the key levers, the universal bar T is rocked so as to move the arms $t^2$ upwardly, and thus the screw t is operated to impart a sliding movement to escapement slide S. The upward movement of this escapement slide lifts the movable escapement dog Q, and said dog acts upon the escapement wheel O so as to tilt it upon the squared part of shaft m, whereby the escapement wheel is lifted above the path of the fixed dog P, but said escapement wheel is precluded from turning under the pull of the carriage spring, by reason of the engagement of one tooth of the wheel with a shoulder q of the movable dog Q. When the pressure is removed from the key lever the universal bar and the slide are returned by suitable mechanism to their normal positions, thereby lowering slide S and the dog Q, the downward movement of the dog Q being facilitated by a suitable spring. As the dog Q is lowered its shoulder q is withdrawn from the path of a tooth on the escapement wheel, and thus the escapement wheel is permitted to turn under the pull of the carriage spring until the next tooth of the escapement wheel engages with the fixed dog P, whereby the carriage is permitted to move one step under the control of the escapement and the pull of the carriage spring. The escapement dog Q is shown as a flat bar which is pivoted at q' on fixed bracket o', see Fig. 2, and with this dog is associated a suitable spring which acts to normally retain the dog Q in the position of Figs. 1 and 2.

When the carriage is to be removed from bed E it is important that the escapement shall be manipulated so as to allow the free endwise movement of the carriage in withdrawing it from the bed, and to this end, I provide means whereby the escapement is permitted to act freely upon the withdrawal of the carriage. One embodiment of means for releasing the escapement is illustrated more particularly in Figs. 1, 2 and 3 of the drawings. A releasing bar V is positioned horizontally at the rear of carriage F, said bar extending lengthwise of the carriage. The bar is provided with inclined slots v through which pass screws v' which operate to attach the bar V to the carriage in a manner which enables said bar V to have a diagonal sliding movement upon said carriage. The bar V is provided at one end with an operating device V' against which acts a spring $V^2$, preferably a flat leaf spring which is attached to an end plate f' of the carriage, and acts against the finger piece V', so as to lift bar V and retain the same in a raised position.

The rock shaft W is journaled in suitable bearings w on the under side of bed E, said rock shaft being positioned transversely with respect to the bed. On one end of this rock shaft is secured the detent K adapted to coöperate with the stop member k on either of the margin stops J', as heretofore described, but the other end of rock shaft W is provided with a detent arm W', the latter being positioned immediately below the release bar V. The rock shaft is provided, also, with an operating arm w' which extends across escapement wheel O, and when this shaft is turned, the arm w' acts to depress the escapement wheel on one side thereof, for the purpose of moving the escapement wheel into the inclined position of Fig. 3.

When it is desired to withdraw the carriage from bed E, the operator presses against finger piece V' so as to impart a downward movement to bar V, which bar acts on the arm W', for the purpose of turning rock shaft W. The arm w' presses upon one side of the escapement wheel O for the purpose of moving the same to a tilted position, as in Fig. 3, thus lifting the opposite side of the wheel O and moving it free from engagement with either of the dogs P, Q. The movement of the rock shaft W withdraws detent arm K from the path of the stop member k of the margin stops J', and thus the operator is enabled to withdraw the carriage by moving it endwise along bed E without any resistance from the escapement mechanism, and without any interference by the margin stops. The escapement wheel O being free from engagement with either of the dogs P, Q, rack L will operate on gear M to turn shaft m and escapement wheel O, the parts turning freely at this time because the escapement wheel is free from the dogs. As the carriage is withdrawn a certain distance from the bed, coupling G' engages with keeper F' so as to automatically disconnect the spring from the carriage, and thus the carriage may be withdrawn from the machine without disturbing any of its operating parts. In this connection it is to be observed that the escapement is free from the tension of the carriage spring when the carriage is disconnected from the machine, thus relieving all parts of the escapement from strain when the machine is packed for storage or transportation. Again, the tension on the carriage spring is not wholly relaxed, for the reason that upon the withdrawal of the carriage, coupling G' is engaged with keeper F' so as to retain the carriage spring under minimum tension, and furthermore, the coupling G' is retained by keeper F' in the path of the carriage when the latter is inserted in the machine. The carriage is thus removable bodily from the bed and other parts of the machine without dismantling or disarranging any of the working parts, and thus the carriage is adapted to be stored or packed for convenience in transportation, etc. The carriage and the machine are easily and quickly separated for the purpose of securing an extremely compact disposition of the parts and precluding injury to the parts during transportation, and in practice it is preferred to employ a suitable case within which the machine and the carriage are adapted to be separately packed or retained for transportation purposes.

An important advantage in my invention is that carriages of different sizes may be used in connection with one machine, as is frequently desirable in tabulating, billing, and other classes of work. It is obvious that a carriage of one length may be inserted into the machine and used in connection with all the operating parts. Such a carriage may be easily withdrawn from the machine and it is adapted to be replaced by a carriage of a different length, either longer or shorter, according to the work it is desired to perform in the machine.

While I have shown and described my invention in connection with various parts of a typewriting machine, it is evident that parts of the invention may be used without the whole.

Having thus fully described the invention, what I claim as new, and desire to secure by Letters Patent is:—

1. In a typewriter, the combination with a frame, and a platen carriage supported for sliding movement thereon and to be removed bodily therefrom, of a marginal stop coöperating with said carriage, an escapement, and a releasing device supported by the carriage for positioning the marginal stop and the escapement so as to free them from the carriage and permit removal thereof from said frame.

2. In a typewriter, the combination with a frame, and a platen carriage supported for sliding movement thereon and to be removed bodily therefrom, of a marginal stop for arresting the carriage at a predetermined point in the writing line, an escapement, said marginal stop and the escapement being normally in coöperative relation to the carriage, and a release key coöperating with said marginal stop and with said escapement for shifting both of them into positions free from the carriage so as to permit the latter to be removed by sliding it off the frame.

3. In a typewriter, the combination with a frame, and a platen carriage supported for sliding movement thereon and to be removed bodily therefrom, a marginal stop for arresting the platen carriage at a predetermined point in the writing line, an escapement, said marginal stop and the escapement being normally in coöperative relation to said carriage, and a single release key coöperating with said marginal stop and said escapement, said key operating to simultaneously position the marginal stop and the escapement free from the platen carriage so as to permit the latter to be taken off with an unrestrained sliding movement from said frame.

4. In a typewriter, the combination with a platen carriage, and tension means therefor, of a marginal stop, an escapement, a single release key mounted on the carriage and coöperating with both the marginal stop and the escapement for releasing the same to permit removal of the carriage, and means for uncoupling the tension means from the carriage during the operation of removing the latter and while the marginal stop and escapement are released from said carriage by said key.

5. In a typewriter, the combination with a frame, and a platen carriage supported for sliding movement thereon and to be removed bodily therefrom, of an escapement, a marginal stop, said escapement and the marginal stop being normally in coöperative relation to the platen carriage, a releasing member in operative relation to the marginal stop and the escapement, a single release key on the carriage, and means connecting the release key with the releasing member so as to position said marginal stop and the escapement free from contact with the carriage to permit the latter to be removed freely from the frame.

6. In a typewriter, the combination with a platen carriage, an escapement, and a marginal stop, of a releasing member supported independently of the carriage and coöperating with both the marginal stop and the escapement, a single release key supported on the carriage, and a member supported on the carriage for operation by said key, said member coöperating with the releasing member at all points in the travel of the carriage so as to effect the release of the marginal stop and the escapement prior to the removal of the carriage.

7. In a typewriter, the combination with a platen carriage, an escapement, and a marginal stop, of a releasing member supported independently of the carriage and coöperating with said marginal stop and with the escapement, a release key mounted on the carriage, and a shifting release bar supported on the carriage and positioned for contact with said releasing member, said release bar being operable by the release key for disengaging the marginal stop and the escapement prior to the removal of the carriage.

8. In a typewriter, the combination with a platen carriage, an escapement, and a marginal stop, of a pivoted releasing member disconnected from the carriage and coöperating with both the marginal stop and the escapement, a release bar supported on the carriage and positioned for contact with said releasing member, means for retaining the release bar normally free from the releasing member, and a release key supported on the carriage and operating the release bar for disengaging the marginal stop and the escapement to permit removal of the carriage.

9. In a typewriter, the combination with a platen carriage, an escapement, and a marginal stop, of a releasing member having a part normally in the path of the marginal stop and another part in coöperative relation to the escapement, and a release key supported on the carriage and operatively related to said releasing member for disengaging the marginal stop and the escapement prior to the removal of the carriage.

10. In a typewriter, the combination with a platen carriage, an escapement, and a marginal stop, of a releasing member pivoted below the path of said carriage, said releasing member having a part coöperating with the marginal stop and another part in operative relation to the escapement, and a release key on said carriage, said release key coöperating with the releasing member for releasing the marginal stop and the escapement prior to the removal of the carriage.

11. In a typewriter, the combination with a platen carriage, an escapement, and a marginal stop, of a rock shaft separate from the carriage, an arm on the rock shaft normally in the path of said marginal stop, a second arm on the rock shaft in operative relation to the escapement, a third arm on the rock shaft, and a release key supported on the carriage for contact with said third arm and operable to release both the marginal stop and the escapement prior to the removal of the carriage.

12. In a typewriter, the combination with a platen carriage, an escapement, and a marginal stop, of a single release key supported on the carriage, a release bar mounted on the carriage for sliding movement thereon, said release bar being depressible by the operation of the release key, and a releasing member supported separately from the carriage and coöperating with said marginal stop and with the escapement, said releasing member being positioned normally in the path of, and free from contact with, said release bar.

13. In a typewriter, the combination with a platen carriage, an escapement, and a marginal stop, of a single release key supported on the carriage, a release bar mounted on the carriage for sliding movement thereon, said release bar being depressible by the operation of the release key, a releasing member supported separately from the carriage and coöperating with said marginal stop and with the escapement, and means for retaining the releasing bar normally free from contact with the releasing member.

14. In a typewriter, the combination with a platen carriage, an escapement, and a marginal stop, of a single release key supported on the carriage, a diagonally slotted release bar attached to the carriage for sliding movement thereon, said release bar being depressible by the release key, a releasing member positioned in operative relation to both the marginal stop and the escapement, said releasing member having a part normally in the path of the release bar, and a spring for lifting the release bar normally free from contact with said part of the releasing member.

15. In a typewriter, the combination with a platen carriage, and a spring-actuated drum for imparting movement thereto, of a separable coupling for connecting the drum with said carriage, a marginal stop, an escapement, a single release key mounted on the carriage and operable to release the marginal stop and the escapement to permit removal of the carriage, and means for engaging the separable coupling upon the removal of said carriage whereby the drum is disengaged from the carriage and the spring is retained under tension upon the removal of the carriage.

16. In a typewriter, the combination with a platen carriage, a marginal stop therefor, and an escapement, of a spring actuated drum, a separable coupling for connecting said drum with the carriage for placing the latter under tension, a single release key for releasing the marginal stop and the escapement prior to the removal of the carriage, and means positioned in the path of said separable coupling and engageable therewith during the removal of the carriage whereby the drum is disengaged from the carriage and the spring is retained under tension.

17. In a typewriter, a carriage, an escapement coöperating with the carriage, a stop device coöperating with the carriage, and a single manual device positioned on the carriage to release the escapement and to disengage the stop device whereby the carriage as an entity may be removed from the machine.

18. In a typewriter, a carriage, an escapement coöperating with the carriage, a stop device coöperating with the carriage, a main spring so connected to the carriage as to exert tension upon said escapement, means for releasing the main spring upon the removal of the carriage, and a single manual device positioned on the carriage to release the escapement and to disengage the stop device whereby the carriage as an entity may be removed from the machine.

In testimony whereof I have signed my name to this specification in the presence of two subscribing witnesses.

GEORGE F. ROSE.

Witnesses:
H. I. BERNHARD,
J. F. MOTHERSHEAD.

Copies of this patent may be obtained for five cents each, by addressing the "Commissioner of Patents, Washington, D. C."